United States Patent
Cintron, Jr.

(10) Patent No.: US 9,387,814 B1
(45) Date of Patent: Jul. 12, 2016

(54) VEHICLE RECORDING DEVICE

(71) Applicant: William Cintron, Jr., Perth Amboy, NJ (US)

(72) Inventor: William Cintron, Jr., Perth Amboy, NJ (US)

( * ) Notice: Subject to any disclaimer, the term of this patent is extended or adjusted under 35 U.S.C. 154(b) by 0 days.

(21) Appl. No.: 14/570,589

(22) Filed: Dec. 15, 2014

(51) Int. Cl.
| | |
|---|---|
| *H04N 5/77* | (2006.01) |
| *B60R 11/04* | (2006.01) |
| *H04N 7/18* | (2006.01) |
| *B60R 11/02* | (2006.01) |
| *B60R 11/00* | (2006.01) |

(52) U.S. Cl.
CPC ............ *B60R 11/04* (2013.01); *B60R 11/0217* (2013.01); *B60R 11/0247* (2013.01); *H04N 5/772* (2013.01); *H04N 7/183* (2013.01); *B60R 2011/0003* (2013.01); *B60R 2011/0075* (2013.01)

(58) Field of Classification Search
USPC .................................. 386/358, 359, 362, 224
See application file for complete search history.

(56) References Cited

U.S. PATENT DOCUMENTS

| | | | |
|---|---|---|---|
| 5,027,104 A | | 6/1991 | Reid |
| 5,946,404 A | * | 8/1999 | Bakshi et al. ................. 382/103 |
| 6,151,065 A | * | 11/2000 | Steed et al. .................... 348/148 |
| 6,525,653 B1 | | 2/2003 | Rigmaiden |
| 7,362,372 B2 | * | 4/2008 | Lyon et al. ..................... 348/373 |
| 7,667,579 B2 | * | 2/2010 | DeLine et al. ............. 340/425.5 |
| 7,914,188 B2 | * | 3/2011 | DeLine et al. ................ 362/494 |
| 7,965,336 B2 | * | 6/2011 | Bingle et al. .................. 348/374 |
| 8,237,855 B2 | * | 8/2012 | Chou ............................. 348/373 |
| 8,482,664 B2 | * | 7/2013 | Byrne et al. ................... 348/373 |
| 2005/0062616 A1 | * | 3/2005 | Vernon-Dier et al. ........ 340/908 |
| 2008/0106616 A1 | * | 5/2008 | Nagata et al. ............ 348/231.99 |
| 2009/0320083 A1 | * | 12/2009 | Dajani .......................... 725/110 |
| 2012/0027372 A1 | * | 2/2012 | Holmberg ..................... 386/224 |
| 2015/0318023 A1 | * | 11/2015 | Bushee ......................... 348/373 |

\* cited by examiner

*Primary Examiner* — Daquan Zhao
(74) *Attorney, Agent, or Firm* — Crossley & Stevenson Intellectual Property Law

(57) ABSTRACT

A vehicle recording device featuring a cylindrical housing having a first cylindrical portion and a second cylindrical portion. A video camera, a microphone, and a speaker are each disposed upon a front face of the second cylindrical portion. A play button and a communication port is disposed upon a back face of the first cylindrical portion. A CPU is disposed within the housing. Each of the video camera, the microphone, the speaker, the play button, and the communication port are in operational communication. A concealment cap having an inner cavity is configured to fit each of the front face and a first portion of a second outer perimeter within the inner cavity, forming a closed configuration. The concealment cap has at least one obround cutout configured to reflect a sound wave into the inner cavity of the cap.

9 Claims, 4 Drawing Sheets

VEHICLE RECORDING DEVICE

BACKGROUND OF THE INVENTION

Various types of vehicle recording devices are known in the prior art. Many of these prior art recording devices tend to employ either large cameras or cameras that are somehow exposed or visible to a passerby or a passenger. The visibility of these recording devices renders them susceptible to attracting thieves preying on unattended vehicles. Additionally, the visibility of these prior art cameras is a particular problem when confronted by police officers. A growing problem in the USA is the occurrence of hostile police activity targeted towards innocent and law abiding citizens. These hostile events usually involve unprofessional conduct by police officials and have resulted in unconstitutional arrests, improper civil forfeitures, and unnecessary harassment. While visible cameras would deter such police behavior during stops, these visible systems would fail to capture candid and abusive police behavior.

Thus, what is needed is vehicle recording device having both audio recording and video recording means camouflaged as an air freshener that can be inexpensively manufactured and installed within traditional vehicle cabin, or integrated as a component of a vehicle cabin, but retaining an aesthetic appearance of an air freshener so that it can capture candid and abusive police behavior.

FIELD OF THE INVENTION

The present invention relates to vehicle recording device, and more particularly, to a vehicle recording device camouflaged as an air freshener.

SUMMARY OF THE INVENTION

The general purpose of the present vehicle recording device, described subsequently in greater detail, is to provide a vehicle recording device which has many novel features that result in a vehicle recording device which is not anticipated, rendered obvious, suggested, or even implied by prior art, either alone or in combination thereof.

The device provides an inexpensive concealed vehicle recording device configured to resemble an air freshener, camouflaged so that an unwitting occupant or observer would be unaware that they were being recorded. The vehicle recording device includes video and audio recording means. The device also includes transmission means for transmitting the audio and video recordings to an external device for storage or later observation. The device features a discrete recording button such that an occupant of the vehicle can inconspicuously activate the audio and video recording means without alerting other parties. Additionally, the device includes a CPU that can store audio and video recordings with an unalterable metadata time stamp, rendering said recordings useful as evidence in defense of honest and law abiding citizens confronted with abusive and unprofessional police behavior.

The device includes a cylindrical housing having a first cylindrical portion and a second cylindrical portion. The first cylindrical portion has each of a back face, a front perimeter surface, and a hollow cylindrical first outer perimeter. The second cylindrical portion has each of a front face and a hollow cylindrical second outer perimeter. Wherein, a diameter of the front face is smaller than a diameter of the back face. The device further includes a rounded base having a top surface and a bottom surface. A bottom end of an at least one mounting bracket is disposed upon the top surface. The housing is disposed upon a top end of the at least one mounting bracket. The at least one mounting bracket is configured to steadily support the housing above the base.

A cylindrical concealment cap having each of a round inner surface, a hollow cylindrical concealment cap perimeter, and a cylindrically shaped inner cavity. The inner cavity has a diameter greater than the diameter of the front face. Additionally, the diameter of the inner cavity is smaller than the diameter of the back face. The cylindrical concealment cap is configured to fit each of the front face and a first portion of the second outer perimeter within the inner cavity forming a closed configuration.

The inner surface of the concealment cap has at least one of an obround cutout. Each of a first side wall, a second side wall, a first parabola, and a second parabola of the obround cutout are configured to reflect a sound wave into the inner cavity of the concealment cap.

A recording button is disposed upon the front perimeter surface. A video camera, a microphone, and a speaker are each disposed upon the front face. A play button and a communication port are each disposed upon the back face, while a CPU is disposed within the housing. It is envisioned that the communication port may be a USB communication port, or other equivalent means of transmitting electricity and data packets. The communication port is configured for two-way data transmission and for transmission of electricity to each of the video camera, the microphone, the speaker, and the CPU. Each of the recording button, the video camera, the microphone, the play button, the speaker, the communication port, and the CPU are in operational communication.

The hollow cylindrical concealment cap perimeter is in contact with the recording button whilst in the closed configuration. The concealment cap is configured to press the recording button upon a pressure of the concealment cap towards the housing. The recording button is configured to activate and alternately deactivate each of the video camera, the microphone, and the CPU upon a pressing of the recording button. The concealment cap is configured to partially conceal the front face whilst in the closed configuration. In the closed configuration, the recording button holds the concealment cap at a sufficient distance from the front perimeter surface, such that the device resembles an air freshener. The CPU is configured to store each of an audio recording of the microphone, and a video recording of the video camera. The CPU is further configured to optionally transmit each of the video recording and the audio recording to the communication port. The CPU is configured to transmit each of the video recording and the audio recording with an unalterable metadata timestamp indicating a date and time in which the video recording and audio recordings were made. The play button is configured to activate a transmission of the audio recording from the CPU to the speaker, the speaker configured to play said audio recording.

Thus has been broadly outlined the more important features of the present vehicle recording device so that the detailed description thereof that follows may be better understood and in order that the present contribution to the art may be better appreciated.

Numerous objects, features and advantages of the present vehicle recording device will be readily apparent to those of ordinary skill in the art upon reading the following detailed description of presently preferred, but nonetheless illustrative, examples of the present vehicle recording device when taken in conjunction with the accompanying drawings. The

BRIEF DESCRIPTION OF THE DRAWINGS

Figures

DETAILED DESCRIPTION OF THE DRAWINGS

Figure 1:
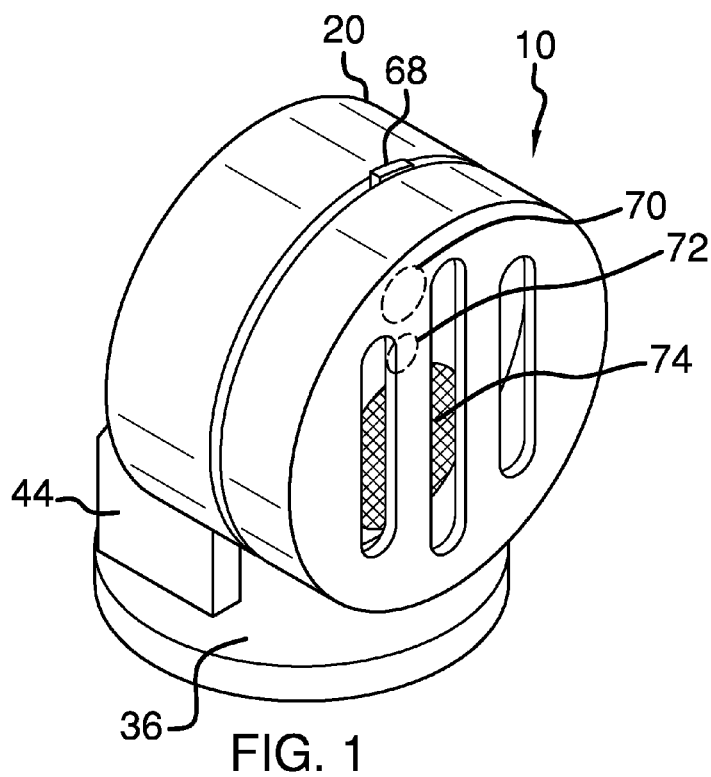
FIG. 1 is an isometric view.
Figure 2:
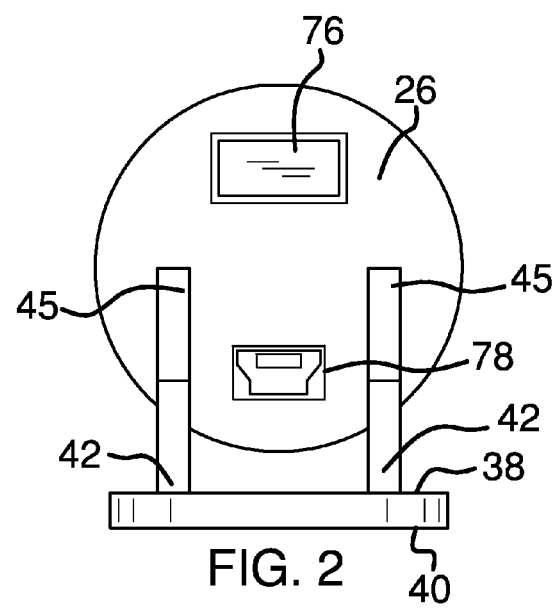
FIG. 2 is a back view.
Figure 3:
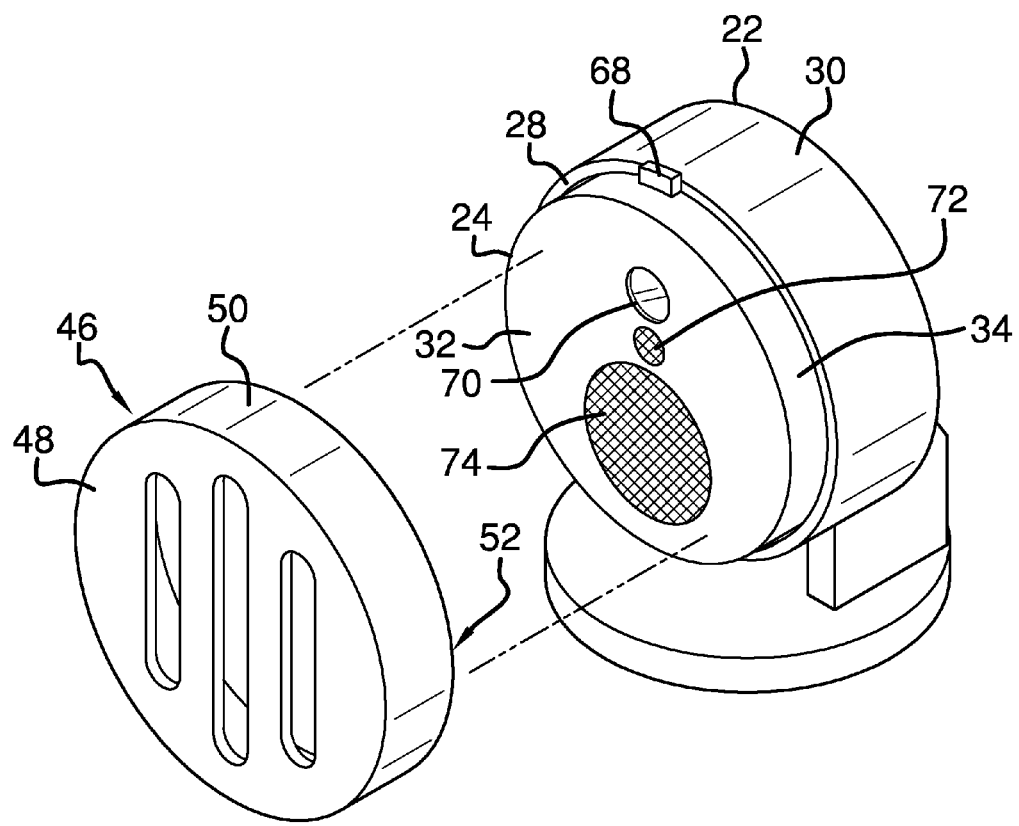
FIG. 3 is an exploded view.
Figure 4:
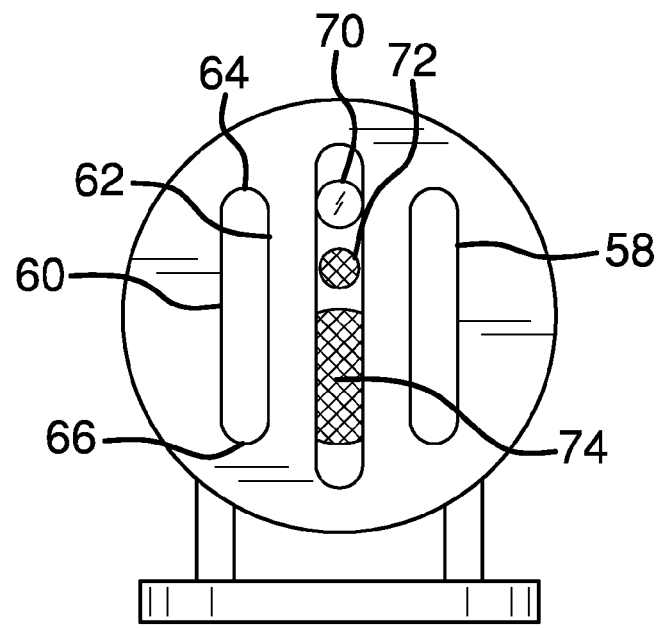
FIG. 4 is a front view.
Figure 5:
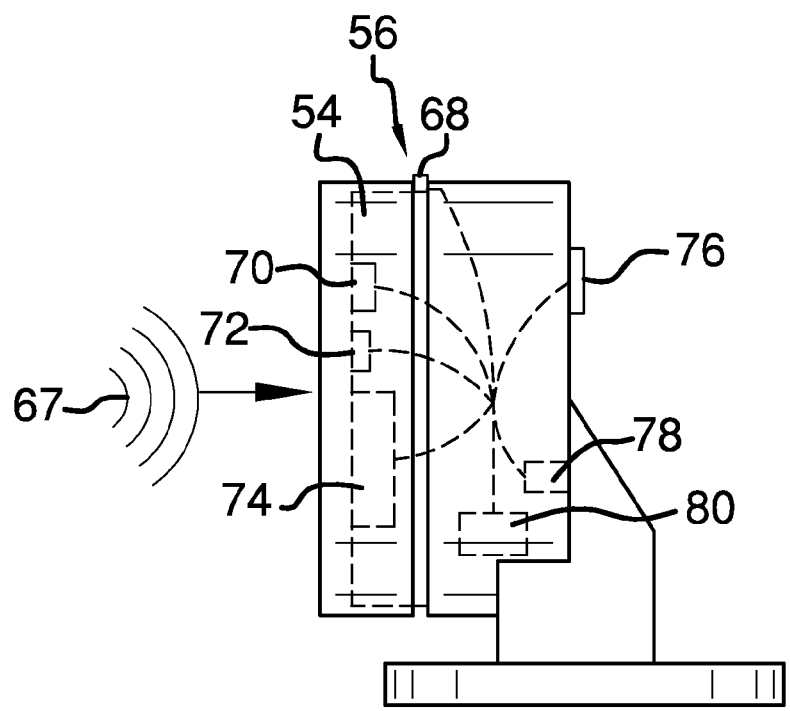
FIG. 5 is a side view.
Figure 6:
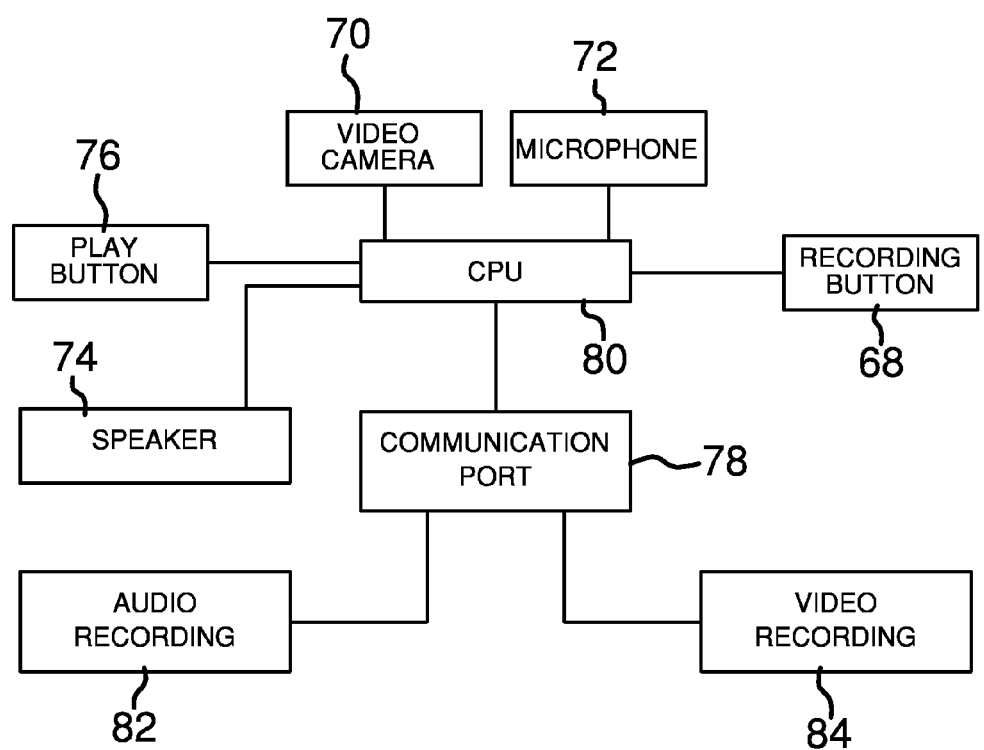
FIG. 6 is a block diagram view.

With reference now to the drawings, and in particular FIGS. 1 through 6 thereof, the instant vehicle recording device employing the principles and concepts of the present vehicle recording device and generally designated by the reference number 10 will be described.

Referring to FIGS. 1 through 6 a preferred embodiment of the present vehicle recording device camouflaged as an air freshener 10 is illustrated. The device 10 includes a cylindrical housing 20 having a first cylindrical portion 22 and a second cylindrical portion 24. The first cylindrical portion 22 has each of a back face 26, a front perimeter surface 28, and a hollow cylindrical first outer perimeter 30. The second cylindrical portion 24 has each of a front face 32 and a hollow cylindrical second outer perimeter 34. Wherein, a diameter of the front face 32 is smaller than a diameter of the back face 26.

The device 10 further includes a rounded base 36 having a top surface 38 and a bottom surface 40. A bottom end 42 of an at least one mounting bracket 44 is disposed upon the top surface 38. The housing 20 is disposed upon a top end 45 of the at least one mounting bracket 44. The at least one mounting bracket 44 is configured to steadily support the housing 20 above the base 36.

A cylindrical concealment cap 46 having each of a round inner surface 48, a hollow cylindrical concealment cap perimeter 50, and a cylindrically shaped inner cavity 52. The inner cavity 52 has a diameter greater than the diameter of the front face 32. Additionally, the diameter of the inner cavity 52 is smaller than the diameter of the back face 26. The cylindrical concealment cap 46 is configured to fit each of the front face 32 and a first portion 54 of the second outer perimeter 34 within the inner cavity 52 forming a closed configuration 56.

The inner surface 48 of the concealment cap 46 has at least one of an obround cutout 58. Each of a first side wall 60, a second side wall 62, a first parabola 64, and a second parabola 66 of the obround cutout 58 are configured to reflect a sound wave 60 into the inner cavity 52 of the concealment cap 46.

A recording button 68 is disposed upon the front perimeter surface 28. A video camera 70, a microphone 72, and a speaker 74 are each disposed upon the front face 32. A play button 76 and a communication port 78 are each disposed upon the back face 26, while a CPU 80 is disposed within the housing 20. It is envisioned that the communication port 78 may be a USB communication port, or other equivalent means of transmitting electricity and data packets. The communication port 78 is configured for two-way data transmission and for transmission of electricity to each of the video camera 70, the microphone 72, the speaker 74, and the CPU 80. Each of the recording button 68, the video camera 70, the microphone 72, the play button 76, the speaker 74, the communication port 78, and the CPU 80 are in operational communication.

The hollow cylindrical concealment cap perimeter 50 is in contact with the recording button 68 whilst in the closed configuration 56. The concealment cap 46 is configured to press the recording button 68 upon a pressure of the concealment cap 46 towards the housing 20. The recording button 68 is configured to activate and alternately deactivate each of the video camera 70, the microphone 72, and the CPU 80 upon a pressing of the recording button 68. The concealment cap 46 is configured to partially conceal the front face 32 whilst in the closed configuration 56. In the closed configuration 56, the recording button 68 holds the concealment cap 46 at a sufficient distance from the front perimeter surface 28, such that the device 10 resembles an air freshener. The CPU 80 is configured to store each of an audio recording 82 of the microphone 72, and a video recording 84 of the video camera 70. The CPU 80 is further configured to optionally transmit each of the video recording 84 and the audio recording 82 to the communication port 78, the communication port 78 configured to transmit the audio recording 82 and video recording 84 to an external CPU. The CPU 80 is configured to transmit each of the video recording 84 and the audio recording 82 with an unalterable metadata timestamp indicating a date and time in which the video recording 84 and audio recordings 82 were made. The play button 76 is configured to activate a transmission of the audio recording 82 from the CPU 80 to the speaker 74, the speaker 74 configured to play said audio recording 82.

What is claimed is:

1. A vehicle recording device camouflaged as an air freshener, comprising:

a cylindrical housing having a first cylindrical portion and a second cylindrical portion, the first cylindrical portion having each of a back face, a front perimeter surface, and a hollow cylindrical first outer perimeter, the second cylindrical portion having each of a front face and a hollow cylindrical second outer perimeter, a diameter of the front face smaller than a diameter of the back face;

a rounded base having a top surface and a bottom surface, a bottom end of an at least one mounting bracket disposed upon the top surface, the housing disposed upon a top end of the at least one mounting bracket, the mounting bracket configured to steadily support the housing above the base;

a cylindrical concealment cap having each of a round inner surface, a hollow cylindrical concealment cap perimeter, and an inner cavity, the inner cavity having a diameter each greater than the diameter of the front face and smaller than the diameter of the back face, the cylindrical concealment cap configured to fit each of the front face and a first portion of the second outer perimeter within the inner cavity forming a closed configuration;

the inner surface of the concealment cap having a first side wall, a second side wall, a first parabola, a second parabola, and at least one of an obround cutout, wherein each of the first side wall, the second side wall, the first parabola, and the second parabola is configured to reflect a sound wave into the inner cavity of the concealment cap;

a recording button disposed upon the front perimeter surface;

a microphone disposed upon the front face;

a play button disposed upon the back face;

a CPU disposed within the housing;

a communication port disposed upon the back face, the communication port configured for two-way data transmission and for transmission of electricity to each of the microphone, and the CPU;

each of the recording button, the microphone, the play button, the port, and the CPU in operational communication;

wherein the concealment cap is configured to press the recording button upon a pressure of the concealment cap towards the housing while in the closed configuration; and wherein a pressing of the recording button activates each of the microphone, and the CPU, the CPU configured to store an audio recording of the microphone, the CPU further configured to optionally transmit the audio recording to the communication port.

2. The vehicle recording device camouflaged as an air freshener of claim 1 further comprising:
a speaker disposed upon the front face;
the communication port further configured for transmission of electricity to the speaker;
the speaker in operational communication with the CPU;
the CPU configured to optionally transmit the audio recording of the microphone to the speaker;
wherein a pressing of the play button activates a transmission of the audio recording to the speaker.

3. The vehicle recording device camouflaged as an air freshener of claim 1 further comprising:
a video camera disposed upon the front face;
the communication port further configured for transmission of electricity to the video camera;
the video camera in operational communication with the CPU;
the CPU configured to optionally transmit a video recording of the video camera to the communication port.

4. The vehicle recording device camouflaged as an air freshener of claim 2 further comprising:
a video camera disposed upon the front face;
the communication port further configured for transmission of electricity to the video camera;
the video camera in operational communication with the CPU;
the CPU configured to optionally transmit a video recording of the video camera to the communication port.

5. The vehicle recording device camouflaged as an air freshener of claim 3 wherein the communication port is a USB communication port.

6. The vehicle recording device camouflaged as an air freshener of claim 4 wherein the communication port is a USB communication port.

7. The vehicle recording device camouflaged as an air freshener of claim 5 wherein the concealment cap is configured to partially conceal the front face.

8. The vehicle recording device camouflaged as an air freshener of claim 6 wherein the concealment cap is configured to partially conceal the front face.

9. A vehicle recording device camouflaged as an air freshener, comprising:
a cylindrical housing having a first cylindrical portion and a second cylindrical portion, the first cylindrical portion having each of a back face, a front perimeter surface, and a hollow cylindrical first outer perimeter, the second cylindrical portion having each of a front face and a hollow cylindrical second outer perimeter, a diameter of the front face smaller than a diameter of the back face;
a rounded base having a top surface and a bottom surface, a bottom end of an at least one mounting bracket disposed upon the top surface, the housing disposed upon a top end of the at least one mounting bracket, the mounting bracket configured to steadily support the housing above the base;
a cylindrical concealment cap having each of a round inner surface, a hollow cylindrical concealment cap perimeter, and an inner cavity, the inner cavity having a diameter each greater than the diameter of the front face and smaller than the diameter of the back face, the cylindrical concealment cap configured to fit each of the front face and a first portion of the second outer perimeter within the inner cavity forming a closed configuration;
the inner surface of the concealment cap having a first side wall, a second side wall, a first parabola, a second parabola, and at least one of an obround cutout, wherein each of the first side wall, the second side wall, the first parabola, and the second parabola is configured to reflect a sound wave into the inner cavity of the concealment cap;
a recording button disposed upon the front perimeter surface;
a video camera disposed upon the front face;
a microphone disposed upon the front face;
a speaker disposed upon the front face;
a play button disposed upon the back face;
a CPU disposed within the housing; and
a USB communication port disposed upon the back face, the USB communication port configured for two-way data transmission and for transmission of electricity to each of the video camera, the microphone, the speaker, and the CPU;
each of the recording button, the video camera, the microphone, the play button, the speaker, the USB communication port, and the CPU in operational communication;
wherein the concealment cap is configured to press the recording button upon a pressure of the concealment cap towards the housing whilst in the closed configuration, the concealment cap configured to partially conceal the front face whilst in the closed configuration;
wherein a pressing of the recording button activates each of the microphone, the video camera, and the CPU, the CPU configured to store each of an audio recording of the microphone, and a video recording of the video camera, the CPU further configured to optionally transmit each of the video recording and the audio recording to the USB communication port; and
wherein a pressing of the play button activates a transmission of the audio recording from the CPU to the speaker.

* * * * *